UNITED STATES PATENT OFFICE.

REUBEN G. ALLERTON, OF NEW YORK, N. Y.

IMPROVED WATER-PROOF FABRIC.

Specification forming part of Letters Patent No. 52,124, dated January 23, 1866; Reissue No. 2,248, dated May 22, 1866.

*To all whom it may concern:*

Be it known that I, REUBEN G. ALLERTON, of the city and State of New York, have invented, made, and applied to use a certain new and useful Improvement in Water-Proof Fabrics; and I do hereby declare the following to be a full, clear, and exact description of the said invention, and of the features that distinguish the same from other water-proof fabrics.

India-rubber and its compounds have heretofore been made into thin sheets; but there is a limit to their thinness, for if too thin there is difficulty in vulcanizing and the sheets are very liable to tear in use. Water-proof surface has also been made of india-rubber and its compounds upon woven fabrics, and said surface has been of greater or less thickness; but in all instances it is necessary to employ sufficient india-rubber to make a perfect coating upon the rough fibrous surface, otherwise the material will not be water-proof.

The nature of my said invention consists in a water-proof fabric formed of paper with a surface of india-rubber, gutta-percha, or their compounds. This, being composed of a paper foundation with a smooth surface, is rendered water-proof by a very thin coating or film of india-rubber or its compounds rolled or applied to its surface much thinner than could be applied to cloth, and therefore said fabric is much lighter and cheaper than cloth, in consequence of requiring a less amount of rubber and the paper being cheaper than cloth.

Besides the foregoing beneficial properties of my said water-proof fabric, it may be mentioned that the surface, being much smoother than the rubber-cloth, will receive printing or writing much better, and hence said fabric may be employed for many uses to which rubber-cloth is not adapted.

This water-proof fabric may be made with the film of rubber, gutta percha, or their compounds upon one or both surfaces of the paper, and the paper itself may be of any desired character.

What I claim, and desire to secure by Letters Patent, is—

The water-proof fabric formed in the manner specified.

In witness whereof I have hereunto set my signature this 23d day of April, A. D. 1866.

REUBEN G. ALLERTON.

Witnesses:
T. G. C. MOUNTAIN,
CHAS. H. SMITH.